United States Patent
Xiang et al.

(10) Patent No.: US 9,165,059 B1
(45) Date of Patent: Oct. 20, 2015

(54) FLEXIBLE BIT FIELD SEARCH METHOD

(71) Applicant: MARVELL INTERNATIONAL LTD., Hamilton (BM)

(72) Inventors: Shuhua Xiang, Fremont, CA (US); Venkata Narayana Pinnamaraju Durga, San Diego, CA (US)

(73) Assignee: MARVELL INTERNATIONAL LTD. (BM)

(*) Notice: Subject to any disclaimer, the term of this patent is extended or adjusted under 35 U.S.C. 154(b) by 0 days.

(21) Appl. No.: 14/171,115

(22) Filed: Feb. 3, 2014

Related U.S. Application Data

(63) Continuation of application No. 12/512,902, filed on Jul. 30, 2009, now Pat. No. 8,645,400.

(60) Provisional application No. 61/085,498, filed on Aug. 1, 2008.

(51) Int. Cl.
  *G06F 7/00* (2006.01)
  *G06F 17/30* (2006.01)

(52) U.S. Cl.
  CPC ............................ *G06F 17/30699* (2013.01)

(58) Field of Classification Search
  USPC .................. 707/754, 761, 712, 745, 999.006
  See application file for complete search history.

(56) References Cited

U.S. PATENT DOCUMENTS

| | | | | |
|---|---|---|---|---|
| 5,570,370 | A | | 10/1996 | Lin |
| 5,727,036 | A | | 3/1998 | Maertens |
| 5,951,651 | A | * | 9/1999 | Lakshman et al. ............ 709/239 |
| 5,995,149 | A | | 11/1999 | Saunders et al. |
| 6,222,841 | B1 | * | 4/2001 | Taniguchi ..................... 370/389 |
| 6,615,201 | B1 | | 9/2003 | Seshadri et al. |
| 6,819,224 | B2 | | 11/2004 | Brierley |
| 7,013,482 | B1 | * | 3/2006 | Krumel .......................... 726/13 |
| 7,028,095 | B1 | * | 4/2006 | Foster et al. .................. 709/231 |
| 7,133,400 | B1 | * | 11/2006 | Henderson et al. ........... 370/389 |
| 7,304,992 | B2 | * | 12/2007 | Relan ............................ 370/392 |
| 7,593,620 | B2 | | 9/2009 | Surcouf et al. |
| 7,640,487 | B2 | | 12/2009 | Amielh-Caprioglio et al. |
| 2002/0057889 | A1 | | 5/2002 | Ando et al. |
| 2003/0065812 | A1 | * | 4/2003 | Beier et al. ..................... 709/236 |
| 2003/0123456 | A1 | | 7/2003 | Denz et al. |
| 2003/0174705 | A1 | * | 9/2003 | Shankar et al. ............... 370/392 |
| 2005/0286563 | A1 | * | 12/2005 | Hong ............................. 370/488 |
| 2008/0240093 | A1 | | 10/2008 | Morad et al. |
| 2009/0262867 | A1 | | 10/2009 | Wan et al. |
| 2010/0008430 | A1 | | 1/2010 | Karczewicz et al. |
| 2011/0022401 | A1 | | 1/2011 | Pang et al. |

\* cited by examiner

*Primary Examiner* — Mohammed R Uddin

(57) ABSTRACT

Systems, methods, and other embodiments associated with flexible bit field search are described. According to one embodiment, an apparatus includes a filter configured to receive data packets and a descriptor. The descriptor includes a header and at least one filter descriptor rule. The header identifies a filtering mode. The at least one filter descriptor rule includes instructions that identify a filtering operation in the filtering mode. The filter is also configured to filter the data packets based, at least in part, on the filtering operation identified in the at least one filter descriptor rule.

20 Claims, 4 Drawing Sheets

FLEXIBLE BIT FIELD SEARCH METHOD

CROSS-REFERENCE TO RELATED APPLICATIONS

This patent disclosure is a continuation of U.S. application Ser. No. 12/512,902 filed on Jul. 30, 2009, now U.S. Pat. No. 8,645,400 which claims benefit under 35 USC §119(e) to U.S. Provisional Application No. 61/085,498 filed Aug. 1, 2008, which are both hereby wholly incorporated by.

FIELD

Aspects of the present invention relate generally to data filtering, and more particularly to an apparatus and method of searching a flexible number of bit fields within a bitstream and comparing the result to a flexible number of rules.

DESCRIPTION OF THE RELATED ART

A hardware engine may be used to filter a bitstream in order to extract data desired by an application. A section is a block of data, which may for example be audio or video data. A section may consist of 4096 bytes. Each section may be divided into transfer packets, which may each consist of 188 bytes, in order to be transmitted in a data transport stream. Each section begins with a header, which may consist of a maximum of 16 bytes, or 128 bits. In such a system, many sections are transmitted in the transport stream, but the user will only desire to capture certain sections. The standard of the application being used will determine what sections are desired. A section filter is a hardware block that follows section filter descriptor rules stored in memory to filter a section to extract the data desired by the application.

In known hardware implementations, a section filter is divided into 16 bytes, or 128 bits. The known section filter can perform two types of section filtering. In the first type, the section header is filtered by determining a match or no match based on each byte, where a match may yield a result of one and a no match may yield a result of zero, and then adding the results for each of the 16 bytes to yield the total result. In the second type, the section header is filtered by specifying a positive mask or negative mask that determines the desired bit value, determining a match or no match based on each byte by applying the mask, where a match may yield a result of one and a no match may yield a result of zero, and then adding the results for each of the 16 bytes to yield the total result. A mask specifies which bits should be matched. When a positive mask is applied, those specified bits with a value of one are matched. When a negative mask is applied, those specified bits with a value of zero are matched. In both of the foregoing types of filtering strategies, the total result determines whether the section is matched or not matched with the requirements of the application standard. If it is matched, the data is extracted.

Known hardware implementations were originally designed for computer disk applications. However, modern applications require greater flexibility. For example, a digital television receiver may look for particular patterns in the transmission stream to identify what programs are available, or which programs are audio and which are video.

One disadvantage of known hardware implementations is that the section filter looks for a particular pattern of 16 bytes, and checks for matches byte by byte. This means that for each byte, the section filter must begin filtering at the beginning of the byte and end filtering at the end of the byte. Thus, the section filter is limited by a byte boundary. However, the data desired by the application may not start at the beginning of a byte, or it may span more than one byte, or it may span more than one packet. Another disadvantage of known hardware implementations is that if the desired pattern is within a range of values, the section must be filtered multiple times to check each value within the range. For example, if byte number one can equal 10-15, the section must be filtered six times. To accomplish this multiple section filtering, a second entity, such as a central processing unit, must run the entire process again. Another disadvantage of known hardware implementations is that if applying multiple section filter descriptor rules is desired, the section must be filtered multiple times because the entire process must be run for each section filter descriptor.

It would be desirable to provide an approach which is sufficiently flexible to accommodate changes over a sufficiently long period of time while particular hardware engines are in use for filtering data transport streams.

SUMMARY

In general, in one aspect, this specification discloses an apparatus. The apparatus includes a filter configured to receive data packets and a descriptor. The descriptor includes a header and at least one filter descriptor rule. The header identifies a filtering mode. The at least one filter descriptor rule includes instructions that identify a filtering operation in the filtering mode. The filter is also configured to filter the data packets based, at least in part, on the filtering operation identified in the at least one filter descriptor rule.

In general, in another aspect, this specification discloses a method for flexible bit field search. The method includes receiving data packets and a descriptor at a filter. The descriptor includes a header and a plurality of filter descriptor rules. The header identifies a filtering mode. At least one filter descriptor rule of the plurality of filter descriptor rules includes instructions that identify a filtering operation in the filtering mode. The method further includes filtering, using the filter, the data packets based, at least in part, on the filtering operation identified in the at least one filter descriptor rule to generate a result.

In general, in one aspect, this specification discloses an apparatus. The apparatus includes a first section filter and a second section filter. The first section filter is configured to receive data packets and a first descriptor. The first descriptor includes a first header and a first filter descriptor rule. The first header identifies a first filtering mode. The first filter descriptor rule includes instructions that identify a first filtering operation in the first filtering mode. The first section filter is further configured to filter the data packets based, at least in part, on the first filtering operation identified in the first filter descriptor rule to generate a first result. The first section filter is also configured to transmit the data packets and the first result to the second section filter for additional filtering.

DETAILED DESCRIPTION

Figure 1:
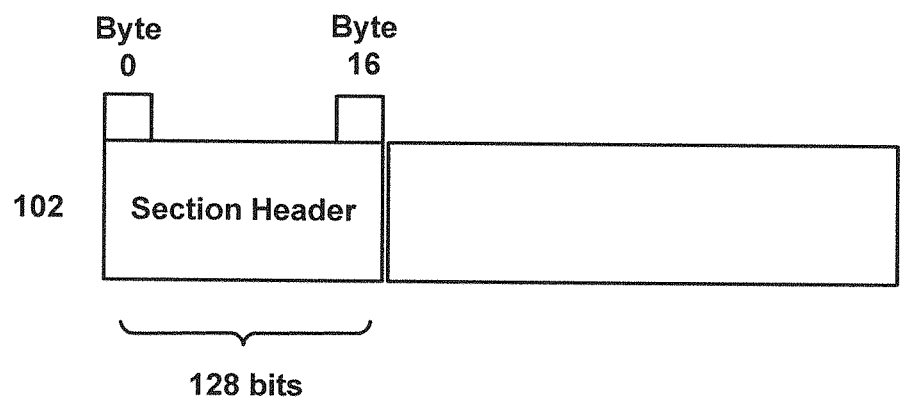
FIG. 1 illustrates a simplified example of a section of data.
Figure 2:
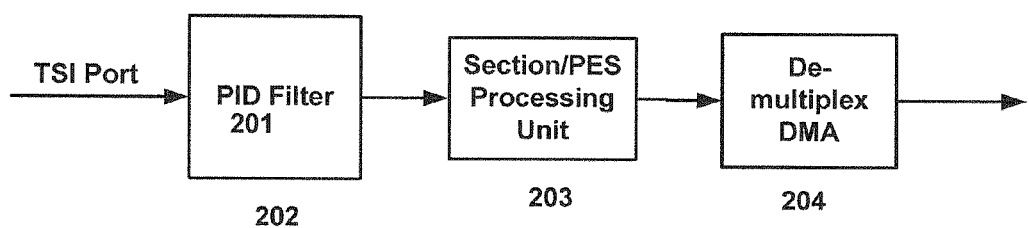
FIG. 2 illustrates a simplified flow chart showing the path of data processed by a current implementation.

FIG. 1 illustrates a simplified example of a data section 101, which may consist of 4096 bytes, containing a section header 102, which may consist of 16 bytes or 128 bits. FIG. 2 illustrates a simplified flow chart showing the path of data processed by a current implementation. Data comprising sections divided into packets of 188 bytes is read from TSI (transport stream input) port 201 into PID (packet identifier) filter 202. Each packet has one unique PID generated by the application associated with it, which PID filter 202 uses to filter the packets desired by the application standard. These packets are read into Section/PES (packetized elemental stream) Processing Unit 203. Some packets contain section data, and these packets are processed by the section filter contained in Section/PES Processing Unit 203. Other packets contain a PES, where the elemental stream may consist of any multimedia content, and these packets are processed separately. The filtered section data and any PES data are read into Demultiplex DMA (direct memory access) 204, which can write the data out to various locations.

In accordance with an embodiment of the present invention, the method and apparatus for a flexible bit field search method may comprise a section filter that can begin filtering section header 102 at any bit in its 128 bit field, and end filtering section header 102 at any bit in its 128 bit field. Thus, the section filtering is no longer limited by a byte boundary. Section filters may also be linked together, providing for flexibility in filtering and extracting the data. For example, the section filter can perform range filtering on section headers based on each byte, by determining whether each byte is within or without of a range specified by the application. Range filtering is accomplished using only one run of the entire process by linking two section filters, one for the range within and one for the range without, and thus multiple runs of the entire process equal to the size of the range are no longer needed. The section filter can also filter the section header based on multiple section filter descriptor rules specified by the application, because multiple section filters can be linked together. Thus, multiple runs of the entire process are no longer needed in order to filter based on multiple section filter descriptor rules.

Figure 3:
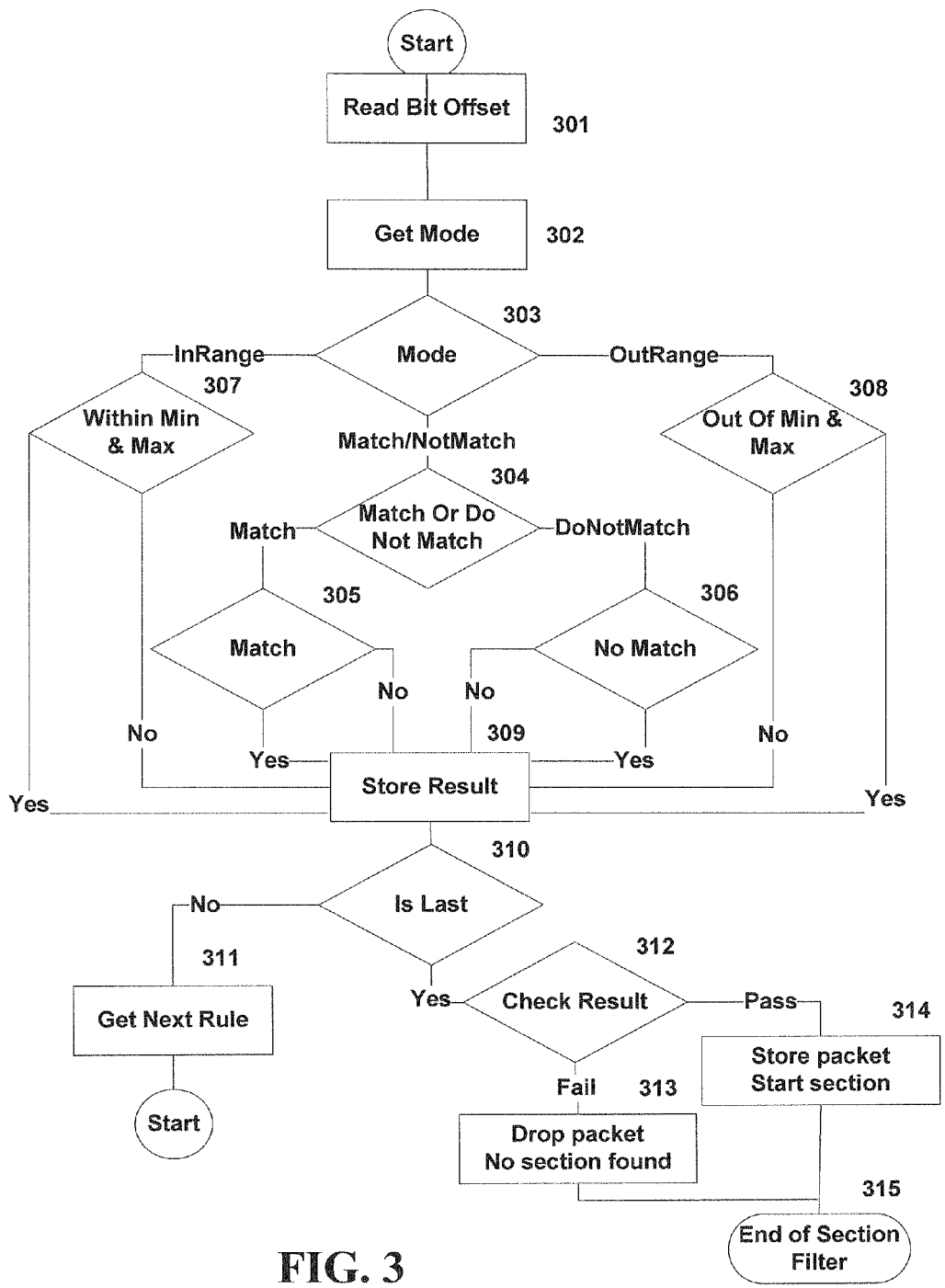
FIG. 3 illustrates a simplified flow chart showing the steps performed by a section filter used in one embodiment of the present invention.

FIG. 3 illustrates a simplified flow chart showing the steps performed by a section filter used in one embodiment of the present invention. At block 301, the section filter reads the bit offset, which instructs the section filter to start at a given bit and end at a given bit in the section header, as desired by the application. At block 302, the section filter receives instructions regarding which mode 303 to employ. The mode 303 may be InRange, OutRange, or Match/NotMatch, for example. The InRange mode is used to determine whether the result of the filtering operations performed on the section header is within a designated minimum and maximum range of values. The OutRange mode is used to determine whether the result of the filtering operations performed on the section header is outside of a designated minimum and maximum range of values. The Match/NotMatch mode is used to determine whether the result of the filtering operations performed on the section header matches a designated value. If the mode 303 is Match/NotMatch, at block 304 the section filter determines whether to apply Match or Do Not Match, and checks each bit accordingly at blocks 305 or 306, where a match may yield a value of one and a no match may yield a value of zero, and these values are added to yield the result, which is stored in block 309. If the mode 303 is InRange, the section filter checks each bit accordingly at block 307, where a match may yield a value of one and a no match may yield a value of zero, and these values are added to yield the result, which is stored in block 309. If the mode 303 is OutRange, the section filter checks each bit accordingly at block 308, where a match may yield a value of one and a no match may yield a value of zero, and these values are added to yield the result, which is stored in block 309. In some implementations, each result may later be checked or compared against a value set by the application.

Because the section header can be filtered by using multiple section filter descriptor rules, as specified by the application, it may be necessary in some circumstances to determine whether a final rule has been employed or if additional rules remain to be employed. Block 310 tells the section filter whether the final rule has been employed, or if there are additional rules to be employed. If block 310 tells the section filter that the final rule has been employed, the result stored in block 309 is checked in block 312 against the value set by the application. If it does not match, the packet is discarded in block 313. If it does match, the packet is stored in block 314. In both cases, the section filtering concludes at block 315.

If the mode 303 is InRange, for example, block 310 may tell the section filter that the last rule has not been employed, and block 311 will instruct the section filter to obtain the next rule, thereby linking it to another section filter. The result stored in block 309 and the section data is transmitted to this further section filter. Then, for example, block 302 may tell this further section filter that the mode 303 is OutRange, and each bit will be checked accordingly at block 308. This result stored in block 309 is either-ANDed with the previous result and the combined result is passed along accordingly. Block 310 may tell the section filter that the final rule has been employed, and the combined result will be checked at block 312 against the value specified by the application. In this way, range filtering can be accomplished by linking two section filters.

Block 311 can also instruct the section filter to obtain the next rule when employing multiple section filter descriptor rules is desirable for the application. As many section filters may be linked as there are section filter descriptor rules, allowing for multiple filtering of the same data.

Figure 4:
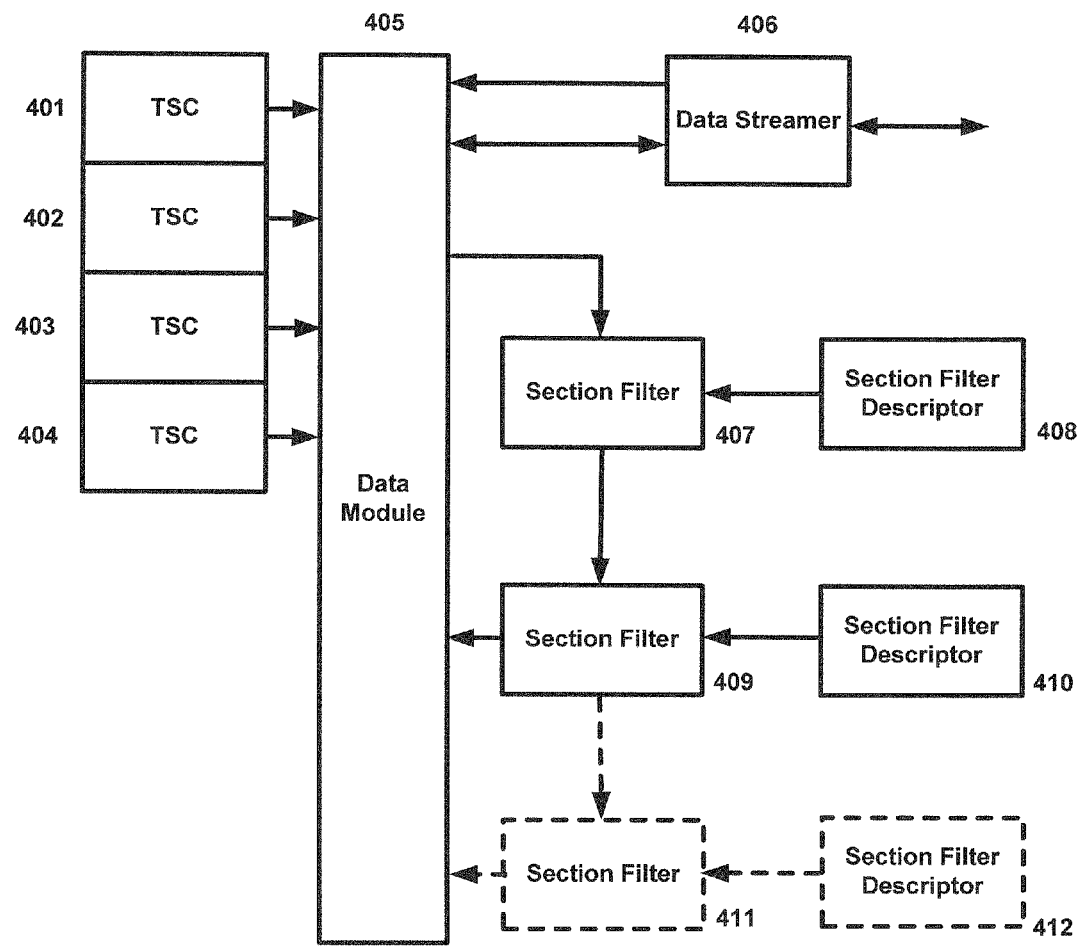
FIG. 4 illustrates an architecture for part of a hardware engine that performs section filtering according to one embodiment of the present invention.

Looking now at an embodiment depicted in FIG. 4, the packets of data to be filtered are sent into TSC (transport stream capture) modules 401-404. TSC modules 401-404 may perform input routing and PID filtering functions similar to those mentioned with respect to FIG. 2, capturing packets as desired by the application. Captured transport packets from TSC modules 401-404 are sent to data module 405. As illustrated in FIG. 4, data module 405 is coupled between TSC modules 401-404 and data streamer 406, and is configured to handle the packets of bitstream data. Input data packets can also be sent to data module 405 through data streamer 406. Section filter 407 reads the data packets from data module 405. Section filter 407 also receives section filter descriptor 408, which may be programmed according to the application being used. Section filter 407 may be constructed with one header and at least one rule. The section filter header and rules are stored in section filter descriptor 408. The section filter header can provide instructions such as to perform a single filtering, to match the PID before performing section filtering, or to point to the next rule, for example. The section filter rules can provide instructions such as Bit Offset (block 301), Match (block 305), No Match (block 306), InRange (block 307), OutRange (block 308), Is Last (block 310), or Get Next Rule (block 311), for example. The data is processed as depicted in FIG. 3, and if the result matches the value specified by the application, the data is sent to data module 405 and written out to desired locations by data streamer 406.

As many additional section filters and section filter descriptors as desired may be added, allowing for multiple filtering of the same data by linking the section filters. If it is desirable to link only two section filters, for example, section filter 407 receives the data packets from data module 405 and the instructions from section filter descriptor 408. Section filter 407 processes the data packets as depicted in FIG. 3. Upon being instructed to get the next rule in block 311, the result stored in block 309 and the data packets are transmitted to section filter 409. Section filter 409 receives instructions from section filter descriptor 410 and processes the data packets as depicted in FIG. 3. Upon being instructed by block 310 that the final rule has been employed, the result from section filter 407 and the result from section filter 409 are checked at block 312 against the value specified by the application. If the results match the value specified by the application, section filter 409 sends the data packets to data module 405, and the data is written out to desired locations by data streamer 406. If the results do not match the value specified by the application, section filter 409 discards the data packets.

Further section filters may be linked as desired. For example, using a third linked section filter is depicted in dashed lines by section filter 411 and section filter descriptor 412. Each section filter transmits the previous results and the data packets to the next section filter until the final rule has been employed, as described above with respect to linking two section filters. The section filter employing the final rule will check all of the results against the value specified by the application, and if the results match, the section filter sends the data packets to data module 405, and the data is written out to desired locations by data streamer 406.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. An apparatus comprising:
a filter, implemented in at least hardware, configured to:
(i) receive data packets and a descriptor, wherein the descriptor includes a header and at least one filter descriptor rule,
wherein the header identifies a filtering mode, and
wherein the at least one filter descriptor rule includes instructions that identify a filtering operation in the filtering mode; and
(ii) filter the data packets based, at least in part, on the filtering operation identified in the at least one filter descriptor rule.

2. The apparatus of claim 1, wherein the filter is configured with a first section filter and a second section filter, wherein the first section filter and the second section filter are linked, and wherein the second section filter is configured to receive a first result of filtered data packets resulting from a first filtering operation performed by the first section filter.

3. The apparatus of claim 1, wherein the filter is configured with a first section filter and a second section filter, wherein the first section filter is configured to filter the data packets based, at least in part, on a first filtering operation identified in the first filter descriptor rule, wherein the second section filter is configured to filter the data packets based, at least in part, on a second filtering operation identified in a second filter descriptor rule, and wherein the first filtering operation is different than the second filtering operation.

4. The apparatus of claim 2, wherein the second section filter is configured to generate a second result, and further wherein the second section filter is configured to:
compare the first result and the second result to a predetermined value, and to discard the data packets based, at least in part, on the comparison.

5. The apparatus of claim 4, further comprising a data module, and wherein the second section filter is configured to compare the first result and the second result to a predetermined value, and to transmit the data packets to the data module based, at least in part, on the comparison.

6. The apparatus of claim 4, further comprising a third section filter configured to:
receive the data packets, the first result, the second result, and a third descriptor that includes a third header and a third filter descriptor rule that identifies a third filtering operation;
filter the data packets based, at least in part, on the third filtering operation, to generate a third result; and
compare the first result, the second result, and the third result to a predetermined value and transmit the data packets to the data module based, at least in part, on the comparison.

7. The apparatus of claim 1, wherein the filtering mode is configured to include instructions configured to cause the filter (i) to perform a single filtering operation, (ii) to match a predetermined packet identifier before performing a filtering operation, or (iii) to point to a next filter descriptor rule in the at least one filter descriptor rule.

8. The apparatus of claim 1, wherein the filtering operation is configured to begin filtering at any bit location in the data packets and to end at any bit location in the data packets.

9. The apparatus of claim 1, wherein the filter is configured to receive a filter instruction in the header that specifies a bit offset based, at least in part, on a filtering mode, and wherein the filter is configured to begin a filtering operation at a bit location corresponding to the bit offset.

10. A method comprising:
receiving data packets and a descriptor at a filter, wherein the descriptor includes a header and a plurality of filter descriptor rules,
wherein the header identifies a filtering mode, and
wherein at least one filter descriptor rule of the plurality of filter descriptor rules includes instructions that identify a filtering operation in the filtering mode; and
filtering, using the filter, the data packets based, at least in part, on the filtering operation identified in the at least one filter descriptor rule to generate a result.

11. The method of claim 10, further comprising:
performing multiple filtering operations on the same data packets by linking a plurality of section filters of the filter by executing the plurality of filter descriptor rules;
wherein the plurality of filter descriptor rules cause the data packets to be passed to different section filters in the plurality of section filters to perform filtering operations on the data packets.

12. The method of claim 10, wherein the data packets are received and filtered by a first section filter of the filter, and wherein the result is a first result, the method further comprising:
transmitting the first result and the data packets to a second section filter of the filter based, at least in part, on a second filter descriptor rule from the plurality of filter descriptor rules; and
performing, using the second section filter, a second filtering operation on the data packets to generate a second result.

13. The method of claim 12, further comprising:
comparing the second result to a predetermined value at the second section filter, and discarding the data packets based, at least in part, on the comparison.

14. The method of claim 12, further comprising:
comparing the second result to the predetermined value at the second section filter, and
transmitting the data packets to a data module based, at least in part, on the comparison.

15. The method of claim 12, further comprising:
transmitting the second result and the data packets to a third section filter of the filter;
performing a third filtering operation on the data packets at the third section filter to generate a third result, and wherein the third filtering operation is associated with a third filter descriptor rule from the plurality of filter descriptor rules;
comparing the first result, the second result, and the third result to the predetermined value; and
transmitting the data packets to a data module based, at least in part, on the comparison.

16. An apparatus comprising:
a first section filter and a second section filter, wherein at least one of the first section filter and the second section filter is implemented in at least hardware, and
wherein the first section filter is configured to:
receive data packets and a first descriptor, wherein the first descriptor includes a first header and a first filter descriptor rule,
wherein the first header identifies a first filtering mode, and
wherein the first filter descriptor rule includes instructions that identify a first filtering operation in the first filtering mode;
filter the data packets based, at least in part, on the first filtering operation identified in the first filter descriptor rule to generate a first result; and
transmit the data packets and the first result to the second section filter for additional filtering.

17. The apparatus of claim 16, wherein the second section filter is configured to:
receive the data packets, the first result, and a second descriptor, wherein the second descriptor includes a second header and a second filter descriptor rule,
wherein the second header identifies a second filtering mode, and
wherein the second filter descriptor rule includes instructions that identify a second filtering operation in the second filtering mode; and
filter the data packets based, at least in part, on the second filtering operation identified in the second filter descriptor rule to generate a second result.

18. The apparatus of claim 17, wherein the second section filter is configured to:
(i) compare the first result and the second result to a predetermined value; and
(ii) discard the data packets based, at least in part, on the comparison.

19. The apparatus of claim 17, further comprising a data module, and wherein the second section filter is configured to:
(i) compare the first result and the second result to a predetermined value, and
(ii) transmit the data packets to the data module based, at least in part, on the comparison.

20. The apparatus of claim 17, further comprising a third section filter configured to:
receive the data packets, the first result, the second result, and a third descriptor that includes a third header and a third filter descriptor rule,
filter the data packets based, at least in part, on a third filtering operation in accordance with the third filter descriptor rule, and to generate a third result; and
compare the first result, the second result, and the third result to a predetermined value and transmit the data packets to the data module based, at least in part, on the comparison.

* * * * *